United States Patent [19]

Daghe et al.

[11] 4,381,020
[45] Apr. 26, 1983

[54] SINGLE AND MULTIPLE SECTION PIPE REPAIR OR SERVICE CLAMPS

[75] Inventors: Joseph L. Daghe, Decatur; William L. Hauffe, Warrensburg; Garrett D. Terrill, Oakley, all of Ill.

[73] Assignee: Mueller Co., Decatur, Ill.

[21] Appl. No.: 288,325

[22] Filed: Jul. 30, 1981

[51] Int. Cl.³ .......................................... F16L 55/16
[52] U.S. Cl. .......................................... 138/99; 24/279
[58] Field of Search ............... 24/279, 280, 281, 282, 24/283, 284, 285, 286; 138/99; 220/213; 285/337, 367, 373, 406, 407, 410, 419, 420; 72/414

[56] References Cited

U.S. PATENT DOCUMENTS

| | | | |
|---|---|---|---|
| 172,669 | 1/1876 | Stevens | 138/99 |
| 192,209 | 6/1877 | Work | 138/99 |
| 1,641,559 | 9/1927 | Thompson | 24/279 |
| 1,659,196 | 2/1928 | Fulton | 24/279 |
| 2,028,609 | 1/1936 | Irwin | 24/279 |
| 2,127,456 | 8/1938 | Adams | 138/99 |
| 2,278,714 | 4/1942 | Stauffer | 138/99 |
| 2,339,759 | 1/1944 | Bidwell | 24/279 |
| 2,341,828 | 2/1944 | Tetzlaff | 24/279 |
| 2,363,206 | 11/1944 | Sprouse | 24/286 |
| 2,659,953 | 11/1953 | Woolsey | 24/279 |
| 2,677,164 | 5/1954 | Stade | 24/279 |
| 2,695,437 | 11/1954 | Bernard | 24/279 |
| 2,816,343 | 12/1957 | Decker, Jr. | 24/279 |
| 2,834,087 | 5/1958 | Herman | 24/279 |
| 2,900,698 | 8/1959 | Zartler | 24/279 |
| 2,936,503 | 5/1960 | Rindfleisch | 24/279 |
| 2,940,151 | 6/1960 | Skelly | 24/279 |
| 2,941,823 | 6/1960 | Good | 285/408 |
| 3,110,948 | 11/1963 | Voss | 24/279 |
| 3,151,373 | 10/1964 | Whitcomb | 24/279 |
| 3,464,722 | 9/1969 | Larkin | 285/367 |
| 3,507,314 | 4/1970 | Zartler | 24/279 |
| 3,565,468 | 2/1971 | Garrett | 285/373 |
| 3,692,062 | 9/1972 | Dunmire | 138/99 |
| 3,807,003 | 4/1974 | Lentz | 24/279 |
| 3,817,564 | 6/1974 | Baldwin et al. | 292/256.67 |
| 3,914,833 | 10/1975 | Dunmire | 24/279 |
| 4,083,588 | 4/1978 | Berger | 285/373 |

*Primary Examiner*—Stephen Marcus
*Assistant Examiner*—Mark Thronson
*Attorney, Agent, or Firm*—Cushman, Darby & Cushman

[57] ABSTRACT

A low profile pipe clamp for use as either a repair clamp or a service clamp with a side outlet. The pipe clamp comprises a flexible band, usually of sheet metal with a gasket material on the interior thereof, the flexible band having a pair of opposed looped ends which receive tubular trunnion loading bars. The trunnion loading bars receive at least a pair of T-bolt assemblies, each assembly including one T-bolt and a nut. The T-bolt assemblies are pre-assembled in one of the trunnion bars having apertures therethrough, this trunnion bar being made of a plurality of coaxial elements whereby the T-bolt may be independently pivoted into position during assembly. The other trunnion bar is provided with slots for receiving the head of the T-bolt and is temporarily held against rotation and axial movement in the loop prior to installation of the clamp.

11 Claims, 12 Drawing Figures

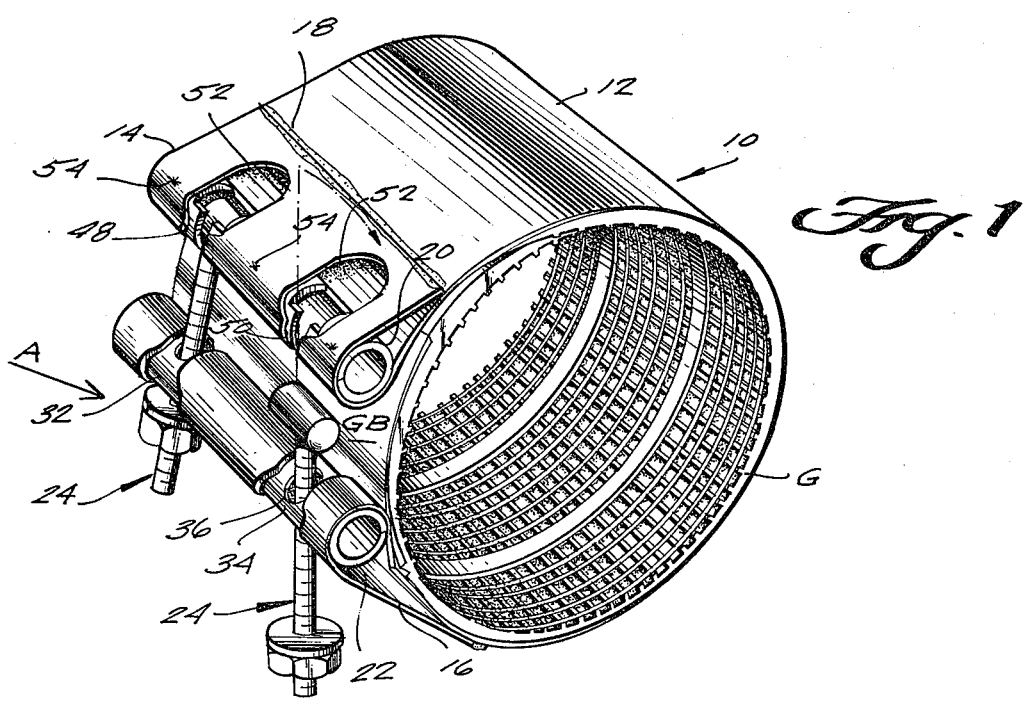
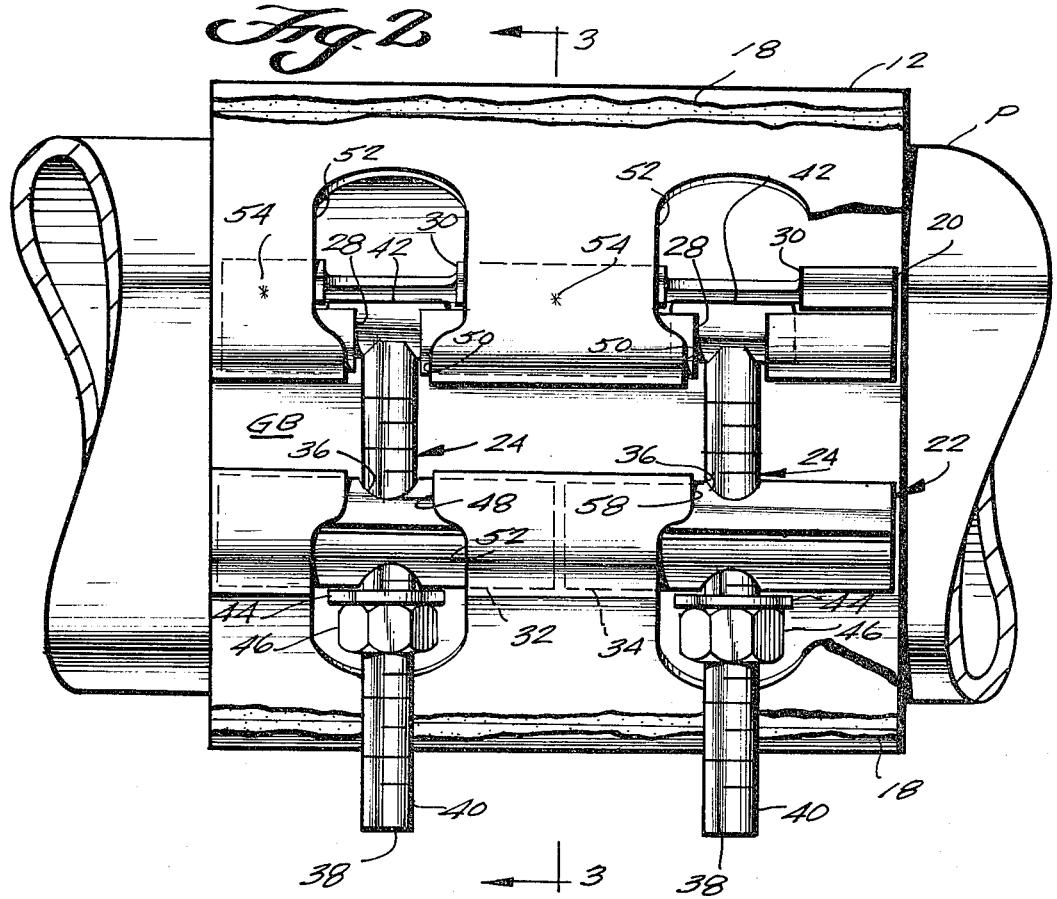

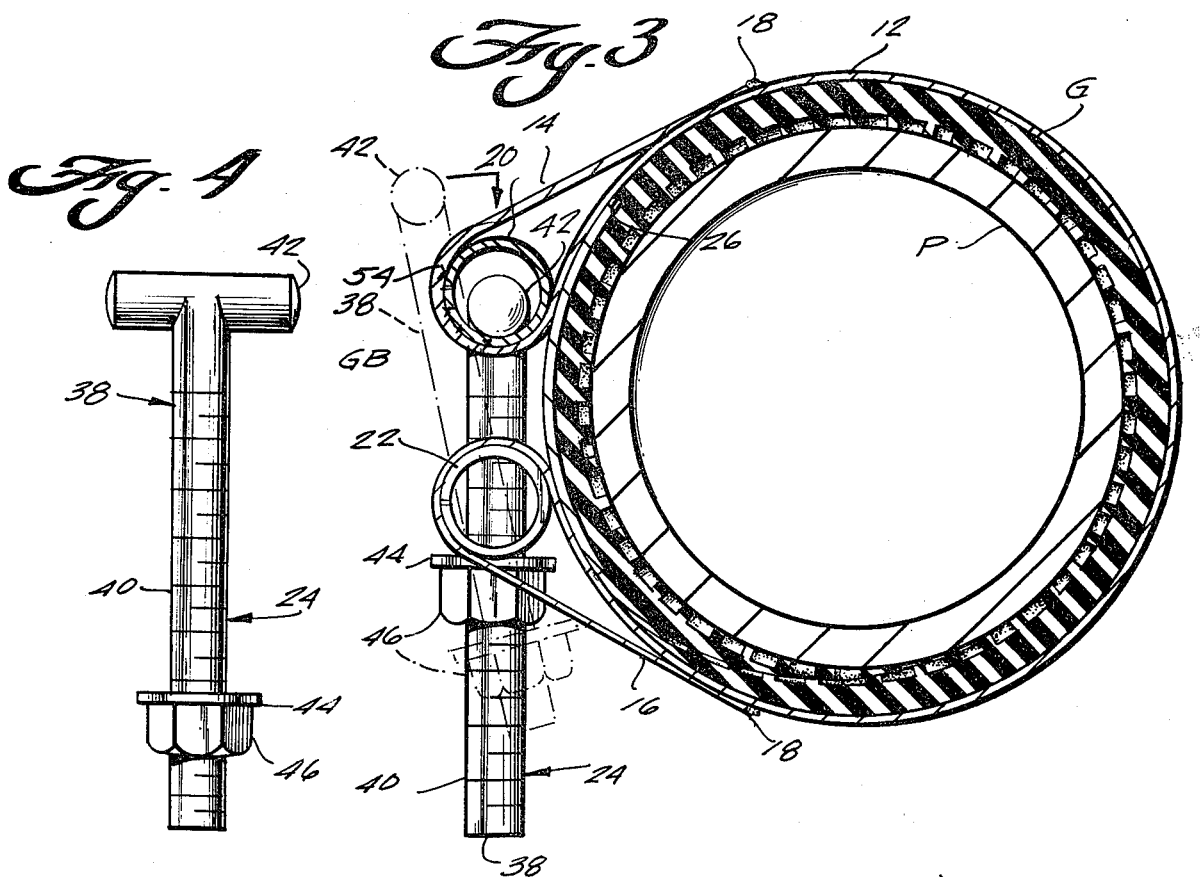
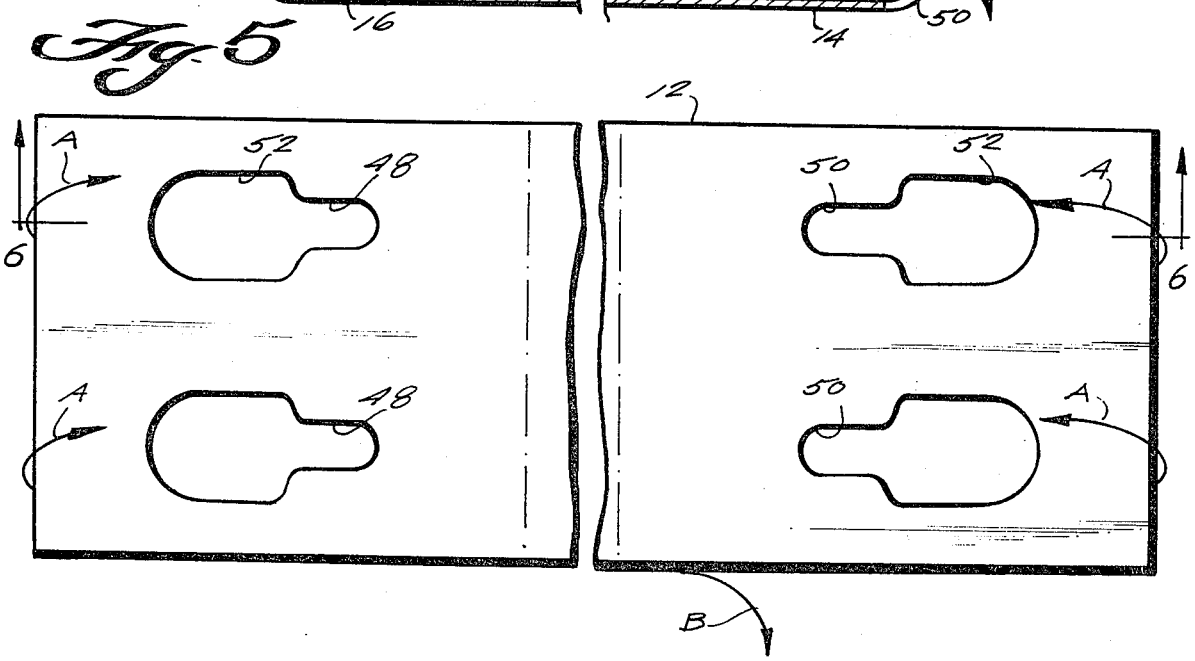

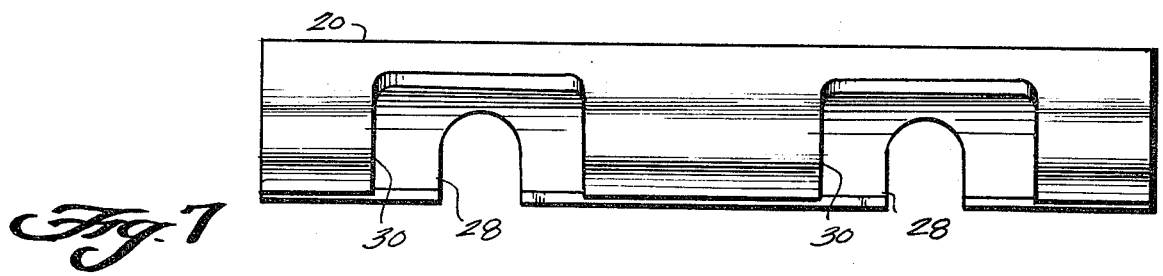
Fig. 7
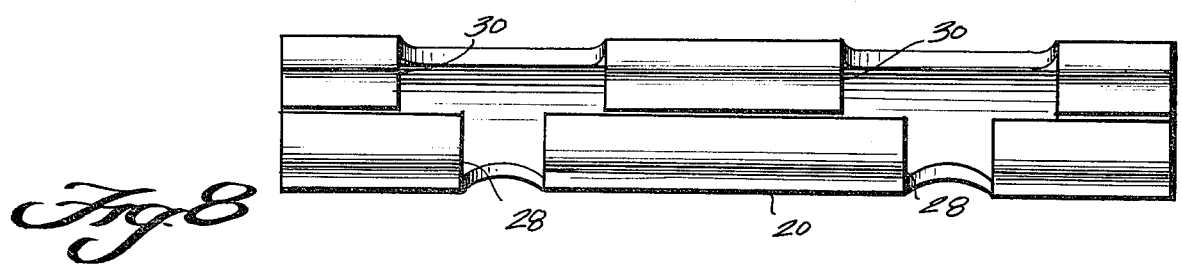
Fig. 8
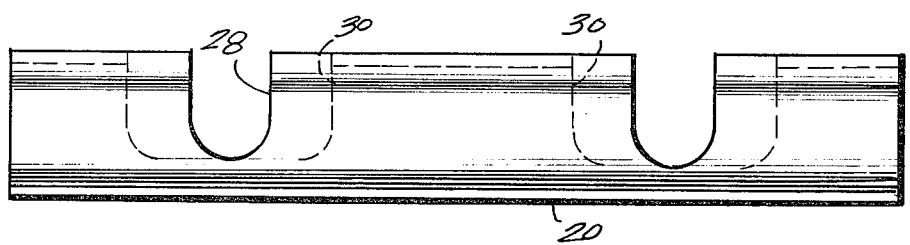
Fig. 9
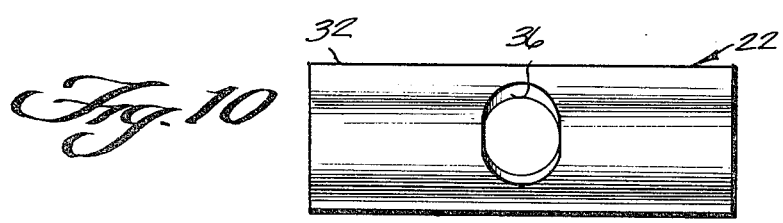
Fig. 10
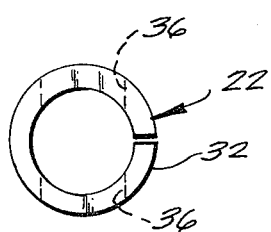
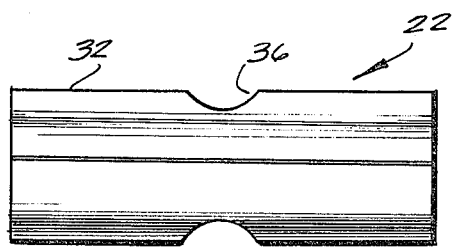
Fig. 11
Fig. 12

SINGLE AND MULTIPLE SECTION PIPE REPAIR OR SERVICE CLAMPS

FIELD OF INVENTION

The present invention relates to an improvement in low profile pipe clamps of the type utilizing a split flexible band means having at least a pair of opposed spaced apart looped ends with tubular trunnions therein. Bolt and nut means are provided for drawing the trunnions and the looped ends toward one another so that the band means tightly encircles the pipe. More particularly, the present invention relates to an improvement in such clamps wherein the bolt and nut means include a T-bolt and a nut, and the T-bolt is pivotally held by one of the trunnions and may have its T-head flipped into a slot provided in the other trunnion. By utilizing the T-bolt bearing on the interior of a rigid trunnion extending substantially across the width of the looped end, more load can be applied during tightening of the clamp on the pipe as the T-bolt and nut means and the trunnions apply the load uniformly across the looped ends. Ancillary to the above and wherein two or more bolt and nut assemblies are utilized to draw the looped ends toward one another, each bolt and nut assembly is arranged to individually pivot relative to the looped end initially carrying the same to provide ease in installation of the T-heads of the T-bolts into the slots of the trunnion in the opposed looped end.

BACKGROUND OF THE INVENTION

Pipe clamps of the type utilizing split flexible bands for encircling the pipe have heretofore been provided with looped opposed ends carrying trunnion loading bars, the looped ends being drawn toward each other by bolts extending through the trunnion bars. In instances where the trunnion loading bars are made from solid or tubular stock, one of the trunnion bars is provided with a threaded aperture therethrough while the other of the trunnion bars is provided with an unthreaded aperture. The bolt is inserted through the unthreaded aperture and then threaded into the threaded aperture of the other trunnion bar, and such an arrangement requires that the clamp be provided with special means to retain the bolt in one of the trunnion loading bars prior to assembly of the clamp on a pipe. Additionally, the installation of such a clamp on a pipe in an excavation is oftentimes done under adverse conditions with the pipe usually covered with muddy water. The person installing the clamp often has difficulty in threading the bolt through the threaded aperture in one of the trunnion bars.

Other clamps of the type utilizing solid or tubular trunnion bars with apertures therethrough rely on a nut and bolt arrangement rather than having the apertures in one of the trunnion bars threaded. This type of clamp is even more difficult to install under adverse conditions as the nuts must be removed from the bolts prior to installation and thus require the person installing the clamp to thread the nuts onto the bolts at the site.

The use of trunnion bars in the looped ends has provided clamps wherein high load can be applied by the band on the pipe; however, the difficulty in installing the clamp on a pipe at the site has outweighed the utility resulting from the use of trunnion bars.

In order to provide pipe repair or service clamps with an arrangement whereby the clamp can be applied to a pipe under adverse conditions, flexible band clamps have been provided with rigid lugs on their opposed split ends, one of the lugs having an aperture therethrough and the other lug having an open slot therein. The lug having the aperture carries the bolt and the nut prior to installation on a pipe, and since the aperture is quite large, the bolt and nut can be swung relative thereto so that the end of the bolt having the head thereon can be swung into the slot on the other lug prior to nut tightening. In some situations the lug carrying the bolt and the nut prior to assembly is provided with means for pivotally carrying the bolt and the nut to enable greater pivotal movement of the bolt. The type of clamp with the "flip-in" bolt and nut arrangement which has required cast lugs has several disadvantages, even though it may be easily installed onto a pipe under adverse conditions. First, means must be provided for attaching the lugs to the ends of the thin flexible band, this making the clamp more costly to manufacture and heavier. Another disadvantage of the clamps utilizing the cast lugs is that the lugs project outwardly from the clamp and make wrapping of the clamp more difficult. While the problem of wrapping for corrosion protection was increased, the profile of the clamp was also increased, thus increasing the likelihood of the clamp being hit by digging equipment during future excavations.

PRIOR ART

Patents relating to flexible split band pipe clamps utilizing trunnion bars in the looped spaced ends of the bands are as follows:

| | | |
|---|---|---|
| 1,641,559 | Thompson | Sept. 6, 1927 |
| 2,028,609 | Irwin | Jan. 21, 1936 |
| 2,127,456 | Adams | Aug. 16, 1938 |
| 2,339,759 | Bidwell | Jan. 25, 1944 |
| 2,341,828 | Tetzlaff | Feb. 15, 1944 |
| 2,363,206 | Sprouse | Nov. 21, 1944 |
| 2,659,953 | Woolsey | Nov. 24, 1953 |
| 3,110,948 | Voss | Nov. 19, 1963 |
| 3,507,314 | Zartler | April 21, 1970 |
| 3,565,468 | Garrett | Feb. 23, 1971 |

In some of the clamps disclosed in the above patents, the trunnion bars are solid and are arranged to rotate relative the looped ends when the bolt and nut means is tightened, whereas in others of the clamps disclosed, the trunnion bars are tubular and also arranged to rotate relative the looped ends when the bolt and nut means is tightened. In some instances just a bolt is utilized with one of the trunnion bars being provided with a threaded aperture therethrough for receiving the bolt, whereas other of the clamps are provided with nuts threaded onto the bolts and bearing against one of the trunnion bars with the bolt head bearing against the other of the trunnion bars. In each of the clamps shown the load is applied uniformly across the looped ends, but the difficulty in installation of the clamp on a pipe is present in all in that either the bolt has to be threaded into a threaded aperture of a trunnion bar at the site or a nut has to be applied to the bolt at the site of installation and this operation is very difficult under adverse conditions often encountered at the site.

The following prior art patents relate to flexible split band pipe clamps of the type utilizing a "flip-in" bolt arrangement which makes installation of the clamp on the pipe easier:

| | | |
|---|---|---|
| 172,669 | Stevens | Jan. 25, 1876 |
| 192,209 | Work | June 19, 1877 |
| 1,659,196 | Fulton | Feb. 14, 1928 |
| 2,278,714 | Stauffer | April 7, 1942 |
| 2,936,503 | Rindfleisch | May 17, 1960 |
| 3,464,722 | Larkin | Sept. 2, 1969 |
| 3,692,062 | Dunmire | Sept. 19, 1972 |
| 3,807,003 | Lentz | April 30, 1974 |
| 3,817,564 | Baldwin et al | June 18, 1974 |

Of the above-listed patents, one of the most relevant appears to be patent 2,936,503 to Rindfleisch which discloses a safety latch for band clamps, the safety latch comprising a T-shaped trunnion fitting rotatable into a strap secured to one end of the flexible band and a T-bolt extending through the T-shaped trunnion and initially held therein by a nut threaded onto the shank of the T-bolt. The bolt may then be pivoted so that the T-head can enter the widened portion of the slot in another strap attached to the opposing end of the flexible band with the T-head directly engaging a portion of the looped strap. This arrangement does not uniformly apply the load completely across the width of the band and consequently the T-head of the bolt bearing directly against a portion of the looped strap would have a tendency to pull out of the looped strap when high loads were applied by the nut.

The remaining patents of the immediately preceding list utilize lugs attached to the ends of the bands for cooperating with "flip-in" bolt means. Such an arrangement is costly to make, heavy and does not provide a low-profile configuration.

BRIEF SUMMARY OF THE INVENTION

The present invention relates to an improved low profile pipe clamp for encircling a pipe, the clamp comprising a split flexible band means having at least one pair of opposed spaced apart looped ends which extend fully widthwise of the band means and in a lengthwise direction of the pipe when the band means encircles the pipe, and each of the looped ends carries a tubular elongated trunnion loading bar, the loading bars having an axial length substantially equal to the width of the looped ends. One trunnion bar is provided with an aperture extending transversely therethrough and is freely rotatable in one of the looped ends, this trunnion bar carrying a T-bolt in the aperture, the T-bolt having a nut threaded thereon at the time of manufacture of the clamp. The other tubular trunnion bar is provided with an open slot having a portion thereof with a width sufficient to receive the T-head of the T-bolt when the T-bolt is pivoted or flipped in during installation of the clamp on a pipe. The T-head of the T-bolt bears against the interior surface of the tubular trunnion bar during tightening of the nut and thus the load applied by the T-head is taken by the rigid tubular trunnion bar and uniformly applied across the width of the looped end.

By such an arrangement as described above, higher torques can be utilized in tightening of the nut on the T-bolt and, thus, the flexible band means will more tightly encircle the pipe. Additionally, the clamp assembly of the present invention has a low profile which enables it to be easily wrapped if necessary to resist corrosion and this also permits the clamp assembly to be installed on a pipe in cramped quarters and under adverse conditions.

The tubular trunnion bar which is provided with the open slot having a widened portion for receiving the T-head is temporarily restrained from rotating or moving axially at the time of manufacture. By such an arrangement, the open slot in the tubular trunnion bar is always in proper position during installation and when the T-bolt is pivoted so that its T-head fits into the slot and bears against the interior of the tubular trunnion bar. When the nut is tightened on the T-bolt and the looped ends of the clamp move toward one another, the tubular trunnion bar which is temporarily restrained against rotation and/or axial movement with at a predetermined load overcome the small force restraining the tubular trunnion bar, thus, allowing the tubular trunnion bar to rotate along with the tubular trunnion bar which is freely rotatable. This prevents bending of the T-bolt.

Ancillary to the above, the low profile clamp of the present invention contemplates use of two or more T-bolt assemblies transversely spaced across the looped ends on larger diameter clamps. In this respect, one of the tubular trunnion bars in one of the looped ends is provided with two or more transversely extending apertures for receiving the T-bolt and nut assemblies, but in order to simplify the installation of a particular T-bolt into a corresponding slot in the other tubular trunnion bar, the tubular trunnion bar carrying the T-bolts is made up of at least two coaxial tubular elements having an overall length substantially equal to the width of the looped ends and the flexible band means. Both of the tubular elements are freely rotatable relative to the looped end carrying the same and rotatable relative to each other. By such an arrangement, each of the T-bolts may be swung or pivoted independently into its position of engagement with the other tubular trunnion bar having the slots therein for receiving the T-head. This arrangement provides ease in installation of large diameter clamps or clamps having large widths on pipes.

BRIEF DESCRIPTION OF THE DRAWINGS

FIG. 1 is a perspective view of the pipe clamp of the present invention, the pipe about which the clamp encircles being omitted for the purpose of clarity;

FIG. 2 is a plan view of the pipe clamp of FIG. 1 taken in the direction of the arrow A;

FIG. 3 is a sectional view taken on the line 3—3 of FIG. 2, the view showing in broken lines one of the T-bolts about to be pivoted into position while the other T-bolt is shown in position for tightening;

FIG. 4 is an elevational view of the T-bolt assembly;

FIG. 5 is a plan view of the sheet metal band of the flexible band means of the pipe clamp of the present invention, the view illustrating the band prior to formation of the looped ends;

FIG. 6 is a cross-sectional elevational view of the sheet metal band taken substantially on the line 6—6 of FIG. 5 but showing the looped ends formed thereon;

FIGS. 7 through 9, inclusive, are various elevational views of the tubular trunnion bar which is provided with the open-ended slot therein;

FIGS. 10 and 11 disclose elevational views of one tubular element of the multi-element tubular trunnion bar, the tubular trunnion bar having the unthreaded aperture therethrough; and FIG. 12 is an end elevational view of FIG. 11 looking in the direction of the arrow B.

DETAILED DESCRIPTION OF THE DRAWINGS

Referring now to the drawings wherein like character or reference numerals represent like or similar parts, and in particular to FIGS. 1 through 3, there is disclosed a low profile clamp of the present invention, the same being generally designated at 10. The pipe clamp 10 encircles a pipe or main P and may be of the type for repairing holes or cracks in the pipe, or it may be of the type provided with a service side outlet to which a service pipe may be connected, the service side outlet being of the type such as disclosed in U.S. Pat. No. 3,467,943, issued Sept. 16, 1969, to Philip N. Adams, and assigned to the same assignee, Mueller Co., Decatur, Ill.

The low profile pipe clamp 10 includes a split flexible band means 12 which completely encircles the pipe P, the band means being provided with opposed looped ends 14 and 16, the ends being formed by being bent back and welded as indicated at 18. The looped ends 14 and 16 are provided with trunnion loading bars 20 and 22, respectively, the trunnion bars 20 and 22 being movable toward one another by bolt means 24. When the trunnion bars 20 and 22 are moved towards one another, they uniformly apply a load completely across the width of the looped ends 14 and 16 as they draw the looped ends 14 and 16 toward each other to cause the band means 12 to tightly encircle the pipe P. The interior of the band means 12 has adhesively secured thereto and carries a gasket member G made of resilient or elastomeric material such as rubber, rubber substitutes or the like, the gasket tightly compressing against the pipe wall to provide a fluid-tight seal therewith. The pipe clamp 10 is usually provided with a gap bridge GB made of metal and adhesively secured in a transverse groove in the outer surface of the gasket G. The gap bridge extends between the looped ends 14 and 16 of the band means 12 when the clamp is assembled on the pipe and thus protects the gasket G from being damaged by the looped ends when the looped ends are drawn toward one another.

The flexible band means 12 is made from a suitable rust-resistant noncorrosive sheet metal material such as stainless steel or the like, although it may be made from plastic materials. Additionally, the bolt means 24, as well as the trunnion loading bars 20 and 22, are made from stainless steel material, although they may be coated with a corrosive-protecting coating if they are made from corrodible steel materials.

Generally, the band means 12 is precurved to provide a semicylindrical portion having a radius of curvature which permits it to be flexed about a pipe of a particular size for which the clamp was designed. For small diameter pipe sizes, the split flexible band means 12 may be made from a single band of sheet material and, thus, would only have a pair of opposed looped ends 14 and 16, one pair of trunnion bars 20, 22, and at least one bolt means 24 for drawing the band means tightly around the pipe. Of course, if it is necessary to have an extremely wide band means to cover an elongated portion of the pipe P, then the pipe clamp 10 may be provided with two or more bolt means as shown in the drawings. Where the pipe clamp 10 is intended for use on very large diameter pipe sizes, then the flexible band means may be made up of at least two, and sometimes more, arcuate sections of the flexible sheet material, and each of the sections may have looped ends with the opposed looped ends of adjacent sections being each provided with the necessary trunnion loading bars and bolt means for tightening the pipe clamp around the pipe.

Referring to FIGS. 7 through 9, inclusive, there is disclosed the trunnion loading bar 20 of the present invention which is tubular and which is rigid. The trunnion bar 20 has an overall axial length substantially equal to the width of the looped end 14, and it is provided with an open slot 28, the slot 28 having a portion at one end thereof widened as indicated at 30. The rigid tubular trunnion bar 20 is preferably made by rolling the same from stainless steel sheet stock with the open slot 28 being either prepunched in the sheet stock or machined in the trunnion bar after the rolling operation. While the preferred form of tubular trunnion bar 20 is made by roll forming sheet stock, it will be appreciated that such trunnion bar could be made from stainless steel seamless tubing stock with the open slot 28 being machined therein.

Referring now to FIGS. 10 through 12, as well as to FIGS. 1 and 2, the tubular trunnion loading bar 22 when utilized with the pipe clamp 10 having a pair of bolt means 24 is made up of coaxial tubular elements or sections 32 and 34 having an overall axial length substantially equal to the width of the looped end 16. The tubular elements 32 and 34, one of which is shown in FIGS. 10 through 12, are each provided with an aperture 36 therethrough and each is freely rotatable in the looped end 16 as will be explained in more detail later in the specification. If only a single bolt means 24 is utilized in the pipe clamp 10, then the tubular trunnion loading bar 22 is made of a single element having an overall axial length equal to the width of the looped end 16 and it is also freely rotatable in the looped end 16.

Tubular trunnion loading bar 22 is similarly made to the tubular trunnion loading bar 20 in that it is preferably made by rolling from stainless steel sheet material with the aperture 36 being either prepunched in the sheet material or machined in the trunnion bar after the rolling operation. Of course, trunnion bar 22 may also be made from seamless tubular stock with the aperture being machined therein.

The bolt means 24 which is shown in FIGS. 1 to 4, inclusive, includes a T-bolt 38 having a threaded shank 40 and a T-head 42. The shank 40 of T-bolt 38 is arranged to receive a washer 44 which bears against the exterior of the tubular trunnion bar 22 and a nut 46 which preliminarily holds the bolt in the trunnion bar 22 and is used to tighten the clamp about the pipe during installation. The T-head 42 of the T-bolt 38 has an axial length slightly less than the widened portion 30 of the tubular trunnion loading bar 20 as it must fit through the widened portion 30 during installation of the clamp and bear against the interior of the tubular trunnion bar when the pipe clamp 10 is installed on a pipe.

The flexible band means 12, as shown in FIGS. 5 and 6, is preferably made from a single thickness of stainless steel sheet material, although it may be made from a double thickness. In the forming of the band means 12, the sheet material is laid out flat and slots 48 are cut in one end portion and slots 50 are cut in the other end portion. The slots 48 and 50 each have a widened portion 52 of a width sufficient to receive the T-head 42 of the T-bolt 38 and the nut and washer 46 and 44, respectively. The looped ends 14 and 16 are formed by bending back the ends of the sheet material in the direction of arrows A in FIG. 5, and then welding the edges of same as indicated at 18 in FIG. 6 and thus the widened portion 52 of the slots 48 and 50 have their enlarged width 52 extending in a longitudinal direction of the band means 12 and positioned away from the terminus of the respective looped ends 14 and 16. The sheet material is precurved in the direction of the arrow B to form the flexible split band means.

In prior art clamp arrangements wherein trunnion bars were utilized in the looped ends of the split flexible band means, the trunnion bars were usually solid and both trunnion bars being provided with apertures therein for receiving bolt means therethrough. In some instances the apertures in one of the trunnion bars were threaded and a bolt having a head was passed through the unthreaded aperture in the other trunnion bar and threaded into the threaded aperture in order to draw the looped heads toward one another. In other instances where both apertures were unthreaded, the bolt was provided with a nut and tightening of the nut on the bolt caused the trunnion bars to draw the looped ends together.

In other prior art arrangements, tubular trunnion bars were utilized rather than solid trunnion bars but in each instance both trunnion bars were provided with unthreaded transverse apertures therethrough and a bolt, and nut means was utilized for drawing the trunnion bars toward one another to tighten the looped ends and band means about the pipe. In this arrangement, the bolt head bore directly on the exterior of the tubular trunnion bars with the nut acting on the exterior of the other trunnion bar.

Both of the arrangements just described required the bolt means to be inserted at the site of the installation of the clamp about a pipe and this required considerable manipulation by the person instaling the clamp on the pipe. In the situation where a nut and bolt arrangement was used, the nut had to be threaded onto the bolt at the site as it was necessary to first slip the bolt means through the apertures in the trunnion bars. In the second arrangement just previously discussed where one of the trunnion bars had a threaded aperture, then it was necessary to install the clamp about the pipe and then thread the bolt into the threaded aperture of the trunnion bar. These operations could be difficult in cramped quarters and under other adverse conditions usually encountered at the site of installation.

As brought out in the introduction portion of the application, many "flip-in" arrangements have been utilized for drawing the ends of split flexible band type clamps toward one another so that the clamps tightly embrace the pipe. In most of the "flip-in" arrangements the flexible band was provided with rigid lugs on its respective ends with one lug having an aperture therethrough and the other lug having a slot or ears therein to receive the shank of the bolt and upon which the head of a T-bolt bore, or for that matter, a conventional bolt head bore. The rigid lugs had to be attached to the flexible band means, and this proved costly and required the use of more material, thus increasing the weight of the band means. The use of lugs also increased the profile of the clamp, thus, making wrapping more difficult. One effort was made to utilize a band means with looped ends and with a single tubular trunnion loading bar with an aperture therethrough. In this arrangement, the tubular trunnion loading bar had an unthreaded aperture to receive the T-bolt, and the nut was installed at the point of manufacture, but the T-head of the bolt bore directly against the inside of the looped end and, thus, the load applied by the T-head was at a local portion of the looped end. Consequently high torques could not be applied in tightening the nut on the T-bolt as the band would fail where the T-head engaged the same. This arrangement lost the effect of providing a trunnion bar which would uniformly apply the load across the entire width of the looped ends of the band means, thereby permitting maximum torque to be applied to the bolt means of the band means.

The pipe clamp 10 of the present invention provides the tubular trunnion bar 20 in the looped end 14, this trunnion bar 20 being arranged to receive the T-head 42 of the T-bolt 38. In order that the trunnion bar 20 will not fall out of the looped end 14 of the clamp during shipping, in order that the widened portion 30 of the open slot 28 is in the proper position to receive the T-head 42 of T-bolt 40 at the time of installation of the clamp on the pipe, the tubular trunnion bar 20 is temporarily restrained from rotating in the looped end 14 and/or moving axially in the looped end 14. This may be accomplished by a friction fit or the tubular trunnion bar 20 can be spot welded to the looped end 14 in one or more places as indicated diagrammatically at 54. As an alternative, the numeral 54 could represent one or more dimples in the looped end 14 which cooperate with a recess in the exterior surface of the tubular trunnion bar 20. A further alternative for temporarily restraining the tubular trunnion bar 20 against rotation or axial movement in the looped end 14 is by the friction means disclosed in the common assignee's copending U.S. application Ser. No. 262,776, filed May 11, 1981. In the aforementioned application, the trunnion bar is provided with one or more annular grooves on its exterior surface arranged to receive a resilient ring having an outside diameter slightly greater than the outside diameter of the trunnion bar. The ring frictionally retains the trunnion bar against rotation or axial movement in the looped end. The subject matter of application Ser. No. 262,776 to this extent is incorporated herein by reference.

The pipe clamp 10 of the present invention is shipped from the point of manufacture with the T-bolt 38 of the bolt means 24 inserted through the unthreaded aperture 36 of the tubular trunnion bar 22, and the nut 46 preliminarily threaded onto the shank 40. Thus, all that is necessary at the site of installation is to pivot the T-bolt 38 from the dotted line position of FIG. 3 to the full line position and then position the T-head bolt 42 within the tubular trunnion bar 20. The nut 46 may then be tightened so as to draw the two tubular trunnion bars toward one another with each trunnion bar applying a uniform load completely across its respective looped end. When the looped ends 14 and 16 begin to draw toward one another and after a predetermined amount of torque has been applied, the temporarily restraining means such as the spot welds or dimples 54 or the friction means is overcome and thus the tubular trunnion bar 20 can rotate relative to its looped end. Of course, the tubular trunnion bar 22, which is freely rotatable in the looped end 16, also rotates relative to the looped end 16 during installation. Further torque can be applied to the nut without bending the shank portion 40 of the T-bolt 38.

In pipe clamps 10 requiring two or more bolt means 24, the tubular trunnion bar 22 is made up of the adjacently positioned and coaxial tubular trunnion elements 32 and 34, each freely rotatable within the looped end 16 and each freely rotatable relative to one another. By such an arrangement, installation of the pipe clamp 10 on a pipe is simplified as each of the T-bolts 38 may be individually pivoted to position its T-head 42 into the widened portion 30 of the slot 28 and then positioned to bear on the interior of the tubular trunnion bar 30. When all of the T-heads 42 have been properly positioned within the tubular trunnion bar 20, then the nuts 46 may be progressively tightened to uniformly tighten the split flexible band means 12 about the pipe.

The terminology used in this specification is for the purpose of description of the invention and not limitation, the scope of the invention being defined in the appended claims.

What is claimed is:

1. A low profile pipe clamp for encircling a pipe, said pipe clamp comprising:

a split flexible band means having at least one pair of opposed spaced apart looped ends extending fully widthwise of the band means and in a lengthwise direction of the pipe when the band means encircles the pipe, each of said looped ends of said band means having at least one slot therein, the slot of one of said looped ends opposing the slot of the other of said looped ends and each slot having a portion thereof with an enlarged width and extending in a longitudinal direction of the band means and positioned away from a terminus of the respective looped ends;

means for drawing said looped ends toward one another to tighten said band means about the pipe, said last-mentioned means distributing a load to said looped ends uniformly across the width of said looped ends and including a first tubular trunnion means freely rotatable in one of said looped ends and having an aperture extending transversely therethrough, said first tubular trunnion means having an axial length substantially equal to the width of the one of said looped ends, a second tubular trunnion means in the other of said looped ends and at least capable of rotation therein when the looped ends are drawn together, said second tubular trunnion means having an axial length substantially equal to the width of the other of said looped ends and having an open slot therein with a portion at one end widened in a direction parallel to the axis of the second tubular trunnion means, a T-bolt having a threaded shank and a T-head, said T-bolt being positioned through the aperture in said first tubular trunnion means and having a nut threaded onto its shank prior to assembly of the clamp on the pipe, said T-bolt and said first tubular trunnion means being pivotable to a position where the T-head of said T-bolt can fit through the widened portion of the slot of said second tubular trunnion means and bear against the interior thereof when the clamp is being assembled on the pipe, and means to hold said second tubular trunnion means temporarily against rotation and axial movement in the other of said looped ends prior to assembly of the clamp on the pipe, said last-mentioned means permitting rotation of said second trunnion means in the other of said looped ends when said looped ends are drawn toward one another.

2. A low profile pipe clamp for encircling a pipe, said clamp comprising:

a split flexible band means having at least one pair of opposed spaced apart looped ends extending fully widthwise of the band means and capable of being drawn together to tighten said band means about the pipe, each of said looped ends of said band means having at least a pair of slots transversely spaced relative to said band means, the slots of one of said looped ends opposing the slots of the other of said looped ends, and each of said slots in each of said looped ends having a portion thereof with an enlarged width and extending in a longitudinal direction of said band means and positioned away from a terminus of the respective looped ends;

means for drawing said looped ends toward one another to tighten said band means about the pipe, said last-mentioned means distributing a load to said looped ends interior uniformly across the width of said looped ends and including a first tubular trunnion means in one of said looped ends and having an axial length substantially equal to the width of the one of said looped ends, said first tubular trunnion means comprising at least two coaxial tubular trunnion elements with each of said elements having an aperature extending transversely therethrough, each of said elements being individually and freely rotatable relative to each other and to the said one of said looped ends, a second tubular trunnion means in the other of said looped ends and at least capable of rotation therein when the looped ends are drawn toward one another, said second tubular trunnion means having an axial length substantially equal to the width of the other of said looped ends and having a plurality of transversely spaced open slots therein, there being one open slot for opposing each aperture in each of said tubular trunnion elements, each of said open slots in said second tubular trunnion means having a portion at one end widened in a direction parallel to the axis of the second tubular trunnion means, a plurality of T-bolts each having a threaded shank and a T-head, one of said T-bolts being positioned in the aperture of each of said trunnion elements of said first tubular trunnion means and having a nut threaded onto its shank prior to assembly of the clamp on the pipe, each of said T-bolts and its respective tubular trunnion element being individually pivotable relative the other of said T-bolts to a position where the T-head can fit through the widened portion of the opposed slot of said second tubular trunnion means and bear against the interior thereof during assembly of the clamp on the pipe; and means to hold said second tubular trunnion means temporarily against rotation and axial movement in the other of said looped ends prior to assembly of the clamp on the pipe, said last-mentioned means permitting rotation of said second trunnion means in the other of said looped ends when said looped ends are drawn toward one another.

3. A low profile pipe clamp as claimed in claims 2 or 1 in which said means to hold said second tubular trunnion means temporarily against rotation and axial movement in the other of said looped ends includes at least one spot weld between said second tubular trunnion means and said other looped ends.

4. A low profile pipe clamp as claimed in claims 2 or 1 in which said means to hold said second tubular trunnion means temporarily against rotation and axial movement in the other of said looped ends includes an adhesive between said second tubular trunnion means and said other looped ends.

5. A low profile pipe clamp as claimed in claims 2 or 1 in which said means to hold said second tubular trunnion means temporarily against rotation and axial movement in the other of said looped ends includes a friction fit between said second tubular trunnion means and the other of said looped ends.

6. A low profile pipe clamp as claimed in claims 2 or 1 in which each of said first and second tubular trunnion means is made from rolled stock.

7. A low profile pipe clamp as claimed in claim 6 in which said flexible band means, said first and second tubular trunnion means, said T-bolt and said nut are all made from stainless steel.

8. A low profile pipe clamp as claimed in claim 6 including an elastomeric gasket adhesively attached to said flexible band means.

9. A low profile pipe clamp as claimed in claim 2 in which said second tubular trunnion means is a single trunnion element.

10. A low profile pipe clamp as claimed in claims 1 or 2 in which said temporary holding means for said second tubular trunnion means includes at least one dimple in the other of said looped ends engaging said second tubular trunnion means.

11. A low profile pipe clamp as claimed in claim 10 in which said second tubular trunnion means is provided with a recess on its exterior surface to receive said dimple.

* * * * *